F. A. SMITH.
PLOTTING DEVICE.
APPLICATION FILED JAN. 23, 1908.
1,065,560.
Patented June 24, 1913.
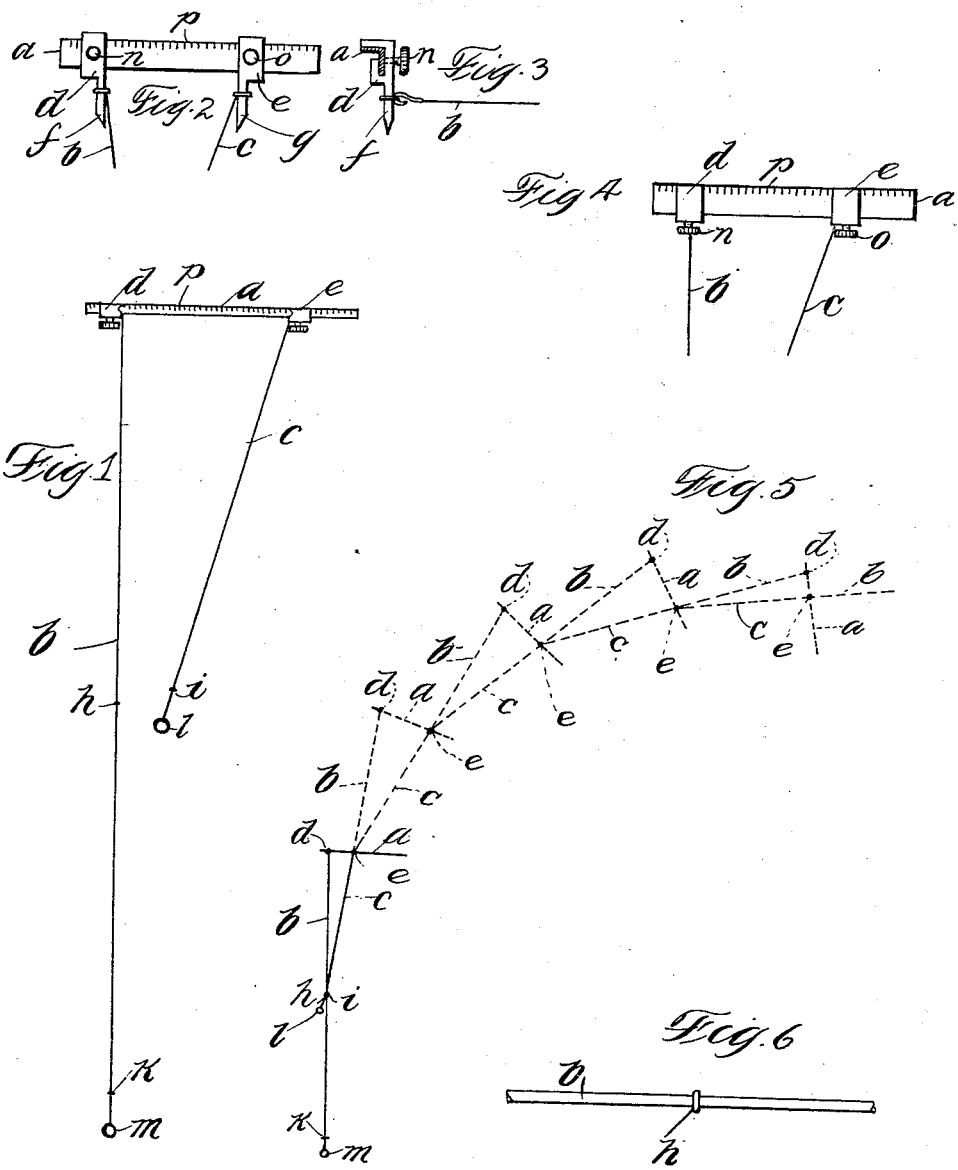

UNITED STATES PATENT OFFICE.

FREDERICK A. SMITH, OF CHICAGO, ILLINOIS.

PLOTTING DEVICE.

1,065,560.  Specification of Letters Patent.  Patented June 24, 1913.

Application filed January 23, 1908. Serial No. 412,262.

*To all whom it may concern:*

Be it known that I, FREDERICK A. SMITH, citizen of the United States, residing at Chicago, in the county of Cook and State of Illinois, have invented a certain new and useful Improvement in Plotting Devices, of which the following is a full, clear, concise, and exact description, reference being had to the accompanying drawings, forming a part of this specification.

My invention relates to plotting devices, and will be fully disclosed by reference to the accompanying drawing, showing the preferred embodiment thereof, and will be set forth in the appended claim.

In the drawing, Figure 1 is a plan view of the preferred form of the invention. Fig. 2 is a side elevation of a component part of the organization shown in Fig. 1. Fig. 3 is an end view of the structure shown in Fig. 2. Fig. 4 is a plan view of the structure shown in Figs. 2 and 3. Fig. 5 is a diagrammatic view illustrating one of the uses to which the invention may be put. Fig. 6 is a detail view of another part of the organization illustrated in Fig. 1.

Like parts are indicated by similar characters of reference throughout the different views.

Referring first to the structure exhibited in Figs. 1, 2, 3, 4 and 6, I employ a scale or gaging bar $a$, from which extend two elongated elements or guide lines $b$ and $c$, desirably in the form of wires. The ends of the lines $b$ and $c$ that are secured to the bar $a$ are desirably movable relatively to each other along the bar, to which end not only one, but preferably both, of the lines $b$ and $c$ terminate in riders that are slidable along the bar, the line $b$ terminating in a rider $d$, while line $c$ terminates in a rider $e$. By this mechanism, the third or base side of a triangle (afforded by bar $a$) may be varied in length. The riders $d$ and $e$ are desirably provided with marking pointers $f$ and $g$ respectively (Figs. 2 and 3). Predetermined relative distances are laid off on the wire lines $b$ and $c$ from their terminals $d$ and $e$, markers $h$ and $i$ being disposed upon said wires to mark said distances. Another distance is desirably laid off on wire $b$ from and beyond its mark $h$ bearing a desired ratio to the distance between the mark $h$ and the rider $d$, this second mark upon the line $b$ being located by a marker $k$. In certain classes of surveying or plotting work, the distance between the parts $d$ and $h$ may equal the distance between the parts $e$ and $i$ and the distance between the parts $h$ and $k$ may be equal to both of the foregoing distances. If desired, the markers may be permanently fixed upon their lines, as, for example, is indicated in Fig. 6, where a marker, as $h$, is shown in the form of a ring brazed to the wire it encircles. In practice the line $c$ is considerably shorter than the line $b$, line $c$ terminating in a grip or ring $l$ shortly beyond its marker $i$, while line $b$ terminates in a grip or ring $m$ beyond its marker $k$.

In one use of the particular apparatus illustrated, the marks $h$ and $i$ are placed together by the user and the portions of the lines between said marks and the gage bar are made taut, whereby there is constituted an isosceles triangle with the portion of the gage bar between the riders $d$ and $e$ as a base. The length of the base is made variable by the relative movability of the ends of the lines $b$ and $c$ secured to the gage bar, the riders desirably having clamping screws $n$ and $o$, whereby the riders are secured upon the bar in the relative position to which they have been adjusted.

The gage bar is provided with scale or division marks $p$, with the aid of which the proper length of triangle base may be selected in plotting lines and curves.

Having now described the preferred embodiment of my invention, I will now describe one of its uses by reference to Fig. 5, which shows the plotting of a railroad or similar curve joining tangents. The riders $d$ and $e$ are first adjusted, so that the initial triangle $d$, $e$, $h$ shown in full lines, shall have a base $d$, $e$ equal to one-half the length of the bases $d$, $e$ of the consequent triangles $d$ $e$ $e$ shown in dotted lines, the scale $p$ serving to guide the user in adjusting the relative positions of the riders, so that a proper length of triangle base may be selected. After the length of the base $d$ $e$ of the first triangle $d$ $e$ $h$ has been selected with the aid of the scale, $a$, having graduations $p$, the marks $h$ and $i$ are placed together by the user, the line $b$ is caused to coincide with the tangent that is to be joined by the curve to be plotted and (in case the lines $b$ and $c$ are flexible, as wire) the lines $b$ and $c$ are made taut, whereby the base $d$ $e$ (shown in full lines) is properly located. The point $e$ is now marked upon the surface upon which the curve is being plotted, as is also the point $h\,i$, whereafter the apparatus is shifted until the point $k$ coincides with the mark previously placed at $h\,i$, the line $b$ is caused to coincide with the side $c$ of the first triangle (shown in full lines) and the next point $e$ (in the base of the first dotted triangle) is located, the base of the second triangle (the first dotted triangle) having been doubled. The bases $d\,e$ of the first and last triangle are desirably half the length of the bases of the intervening triangles, in order that the plotted curve may have the proper tangential connection with the straight lines joined by the curve. In the same manner each succeeding point $e$ of the curve is located, the bases of the subsequent triangles being twice the length of the bases of the very first and very last triangles, the line $c$ of the last triangle coinciding with the second tangent that the curve is to gain.

I have shown one important use to which my invention may be put, but to which use I do not wish to be limited.

As the device is illustrated the markers are permanently fixed upon wires to predetermine the ratios which obtain between the distances of the markers from the slide members.

It is obvious that changes may readily occur in the preferred embodiment of my invention, without departing from the spirit of my invention, and I do not, therefore, wish to be limited to the precise construction shown, but

Having thus described my invention, I claim as new and desire to secure by Letters Patent the following:—

A plotting device including one element bearing measuring scale-marks, a string or wire connected with said element, and a second string or wire also having connection with the said element, the points of connection of the strings or wires with said element being relatively adjustable along the length of said element, one of said strings or wires having marks $h\,k$ thereupon located at different distances from said element, while the other one of said strings or wires has a mark $i$ thereupon adapted for registry with the mark $h$, the mark $k$ being substantially twice as far from said element as the mark $h$.

In witness whereof, I hereunto subscribe my name this 10th day of December A. D., 1907.

FREDERICK A. SMITH.

Witnesses:
G. L. CRAGG,
L. E. STROH.